Figure 1:
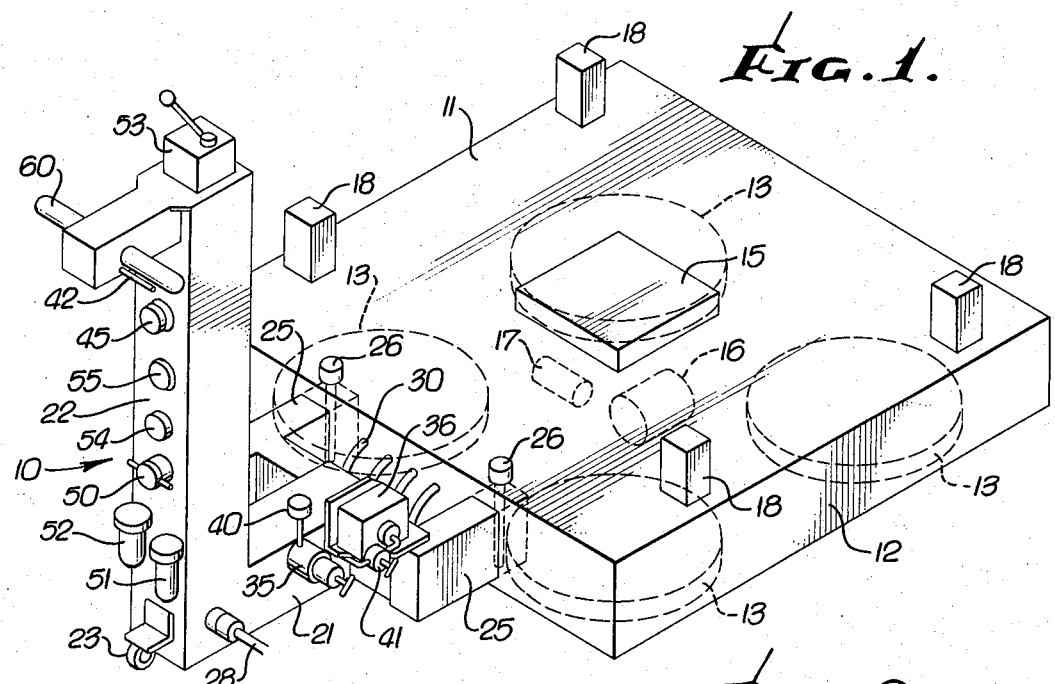

United States Patent [19]
Burdick

[11] 3,791,477
[45] Feb. 12, 1974

[54] CONTROL UNIT FOR AIR CUSHION SYSTEMS

[75] Inventor: Robert E. Burdick, Santa Barbara, Calif.

[73] Assignee: Rolair Systems, Inc., Santa Barbara, Calif.

[22] Filed: Sept. 13, 1972

[21] Appl. No.: 288,599

[52] U.S. Cl.................................. 180/117, 180/125
[51] Int. Cl................................................ B60v 1/00
[58] Field of Search . 180/116, 117, 119, 125, 66 R; 91/31, 32; 214/1 BE

[56] References Cited
UNITED STATES PATENTS

| | | | |
|---|---|---|---|
| 3,392,800 | 7/1968 | Swamy | 180/117 X |
| 3,052,483 | 9/1962 | Petersen | 180/125 X |
| 3,282,359 | 11/1966 | Satterfield | 180/127 |
| 3,326,311 | 6/1967 | Jung | 180/125 |
| 2,731,952 | 1/1956 | Szabo | 91/31 |

FOREIGN PATENTS OR APPLICATIONS 1,243,212  8/1971  Great Britain ................... 214/1 BE Primary Examiner—Kenneth H. Betts
Assistant Examiner—Terrance L. Siemens
Attorney, Agent, or Firm—Harris, Kern, Wallen & Tinsley

[57] ABSTRACT

A control unit for an air cushion transporter having air bearings and an air powered drive motor. A control column connectible to the transporter mechanically and pneumatically, and including an air bearing on-off control, a drive motor forward-reverse control, and a high pressure start control for the drive motor to reduce starting time when moving heavy loads with large inertia.

4 Claims, 2 Drawing Figures

PATENTED FEB 12 1974  3,791,477

CONTROL UNIT FOR AIR CUSHION SYSTEMS

This invention relates to air cushion devices and in particular, to a control unit for a transporter supported on a plurality of air bearings.

A typical transporter comprises a platform or pallet or other load supporting member and a plurality of air bearings carried under the platform. Compressed air is delivered to the air bearings which generate a film of air between the transporter and the ground surface resulting in very low friction between the transporter and ground. A transporter of this type is shown in the copending application of Robert E. Burdick entitled Replaceable Air Cushion Device, Ser. No. 180,666, filed Sept. 15, 1971.

A large number of transporters may be used in a factory or warehouse or the like, with only a few of the units being moved at any one time. It has been found economically desirable to build the controls for the transporter in a separate control unit which can be connected to a transporter for use in moving a load and then be disconnected for subsequent use with another transporter. After a transporter is floated on its air bearings, it may be moved in various ways and in one embodiment, an air powered drive motor is integrally built into the transporter, with a drive wheel engaging the ground surface for providing the motive force. Since the friction in an air cushion transporter is very low, a relatively low powered unit can be utilized for moving a large load. However a large load has high inertia and the low power drive motors ordinarily take considerable time to initiate load movement.

It is an object of the present invention to provide a new and improved control unit for an air cushion transporter, with the control unit being connectible to the transporter providing air for the various elements of the transporter. A further object is to provide such a control unit comprising a self-contained control column which can be moved about on its own and which can be connected to a transporter for movement with the transporter, requiring only connection to an air pressure source and connection to the transporter. It is a particular object of the invention to provide such a control unit incorporating control mechanisms for the air bearings and for engaging the drive motor with the ground surface and for energizing the drive motor and for providing additional input to the drive motor at starting to overcome the inertia problem with large loads.

Other objects, advantages, features and results will more fully appear in the course of the following description. The drawing merely shows and the description merely describes a preferred embodiment of the present invention which is given by way of illustration or example.

Figure 2:
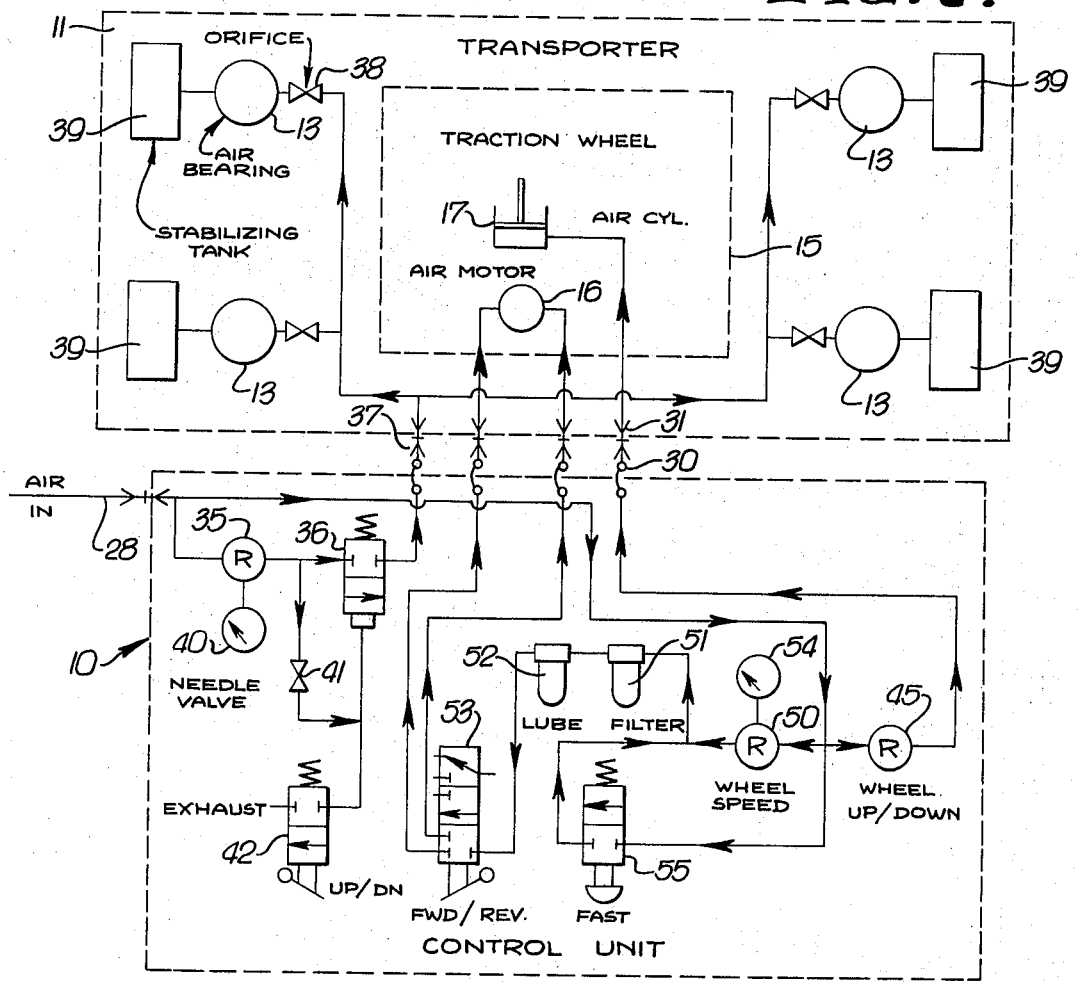

In the drawing:

FIG. 1 is a perspective view of a control unit coupled to a transporter and incorporating the presently preferred embodiment of the invention; and FIG. 2 is a diagram illustrating the pneumatic interconnections of the control unit and transporter of FIG. 1.

In the drawing, a control unit 10 is coupled to a transporter 11. The transporter includes a platform 12 with air bearings 13 mounted on the lower surface in the conventional manner. A drive unit 15 is carried in the transporter and includes an air powered drive motor 16 and an air operated mechanism 17, typically a cylinder and piston arrangement, for urging the drive motor output wheel downward into engagement with the ground surface. The upper surface of the platform 12 may be flat or have various configurations, depending upon the particular load to be transported. In the embodiment illustrated in FIG. 1, vertical posts 18 are fixed to the platform 12 for load engagement when the air bearings are energized.

The preferred embodiment of the control unit 10 illustrated in FIG. 1 includes a horizontal member 21 and a vertical member 22, with a plurality of wheels 23 on the horizontal member 21 for movement of the control unit when separated from a transporter. Projecting arms 25 on the horizontal member 21 are engageable with mating slots in the platform 12 of the transporter, with pins 26 being positionable in aligned holes in the arms and platform for locking the control unit and transporter together. Air under pressure is supplied to the control unit via line 28, preferably with a line coupling at the horizontal member 21. Air interconnections between the control unit and the transporter are made by flexible lines 30 carried on the control unit and plugging into couplings 31 on the transporter platform. The air conduits in the control unit and in the transporter are shown diagrammatically in FIG. 2.

In the control unit, there is an air line from the air inlet 28 through a pressure regulator 35 and an on-off pilot valve 36 to the transporter at coupling 37. In the transporter, air lines run from the coupling 37 to each of the air bearings 13 through an orifice 38 which limits air flow to the bearing. A stabilizing tank or damping chamber 39 is coupled to each air bearing in the transporter. A gauge 40 is connected at the downstream side of the regulator 35 to provide a visual indication of transporter manifold pressure. The downstream side of the regulator 35 is connected to the pilot chamber of the valve 36 through an adjustable needle valve 41, with the pilot chamber connected to exhaust through an on-off valve 42. When the valve 42 is closed against a spring, pressure builds up in the pilot chamber of on-off valve 36 causing it to open allowing supply air to pass to the transporter. Conversely, when valve 42 is opened by releasing the lever, the pressure in the pilot chamber is reduced, thereby allowing the valve 36 to close.

An air line connects the air inlet 28 through another pressure regulator 45 and the control unit-transporter coupling to the air cylinder 17.

Another air line connects the air inlet 28 through a non-relieving pressure regulator 50, a filter 51, a lubricator 52, a forward-reverse valve 53 and the control unit-transporter couplings to the air motor 16. A pressure gauge 54 is connected at the downstream side of the regulator 50. Another on-off valve 55 is connected across the regulator 50, providing a high pressure by-pass around the regulator. The regulator 50 is of the non-relieving type to avoid the high downstream pressure from bleeding back through the regulator 50 to atmosphere due to its lower running speed pressure setting as would occur through the normal relieving type regulator.

In operation, the control unit is attached to a transporter, the coupling pins 26 are placed in position and an air supply is connected at 28. Air flows through the regulator 35 and the needle valve 41 to the pilot inlet of the valve 36, moving it to the open position and supplying air to the air bearings. The purpose of the needle valve is to establish the rate at which air is allowed to flow into the pilot circuit. This results in some dictated amount of residual pressure in said circuit which in turn dictates the response time of on-off valve 36 to the motion of on-off valve 42. The transporter is raised on the insulated air bearings and is ready for movement. The air bearings can be deflated and the transporter lowered at any time by manually actuating the valve 42 to exhaust the pilot inlet and shut off the air supply to the air bearings. The valves 36 and 42 are spring-loaded to the closed or off conditions.

Air is also connected to the air cylinder 17 through the regulator 45, urging the wheel of the drive unit 15 downward to engage the ground surface. This ground engagement acts as a stabilizer to prevent drift of the transporter when floating on the air bearings. If it is desired to move the transporter sideways or to move the transporter forward or backward without using the air motor, the regulator 45 may be manually turned to the off position shutting off the air supply to the air cylinder 17.

The forward-reverse valve 53 is normally in the off position as shown in FIG. 2. When the operator wishes to move the transporter forward, the valve 53 is moved to the forward position, connecting the air supply to the air motor 16 through the regulator 50. The energized air motor rotates the drive wheel and propels the transporter along the ground surface in the forward direction. Reverse motion is obtained in the same manner by moving the valve 53 to the reverse position. The transporter may be steered by manually guiding it at the steering handle 60 at the top of the control unit.

The regulator 50 limits the air pressure to the air motor to the normal operating pressure and produces the normal moving speed of the transporter. At starting, the valve 55 is manually moved from the closed position to the open position, bypassing the regulator 50 and delivering line pressure to the air motor. By this means, a much higher output is obtained from the motor for a short period of time during starting to overcome the inertia of the large load carried by the transporter. The operator moves the valve 53 to the desired direction of motion and manually actuates the valve 55 until the transporter is up to speed. The operator then releases the valve 55 and it is spring-returned to the off position for normal operation of the air motor. With this configuration and control, very large loads may be moved on an air cushion transporter with a relatively small drive motor and relatively low air consumption. The moving transporter may be stopped by shifting the valve 53 to the off position with the air motor acting as a brake and by moving the valve 42 to the open position to deflate the air bearings and let the transporter lower to the ground surface.

What is claimed is:

1. In a control unit for an air cushion transporter having a plurality of air bearings and an air powered drive motor, an air bearing inlet and air motor inlets, the combination of:
   a control column;
   means for mounting said control column to said transporter;
   an air inlet on said control column for a compressed air supply;
   a first pressure regulator;
   a first on-off valve;
   first conduit means in said control column connecting said control column air inlet to said air bearing inlet through said first pressure regulator and said first on-off valve;
   a second pressure regulator;
   a forward-reverse valve;
   second conduit means in said control column connecting said control column air inlet to said air motor inlets through said second pressure regulator and said forward-reverse valve;
   a second on-off valve; and
   third conduit means in said control column connecting said control column air inlet to said forward-reverse valve bypassing said second pressure regulator.

2. A control unit as defined in claim 1 wherein said second on-off valve is spring-loaded to the off condition and includes means for manually holding the valve to the on condition.

3. A control unit as defined in claim 2 wherein said first on-off valve is a pilot valve spring-loaded to the off condition with a pilot inlet for moving the valve to the on condition;
   and including:
   a needle valve;
   a third on-off valve; and
   fourth conduit means in said control column connecting said needle valve between the outlet of said first regulator and said pilot inlet for pressurizing said pilot valve, and connecting said third on-off valve to said pilot inlet for exhausting said pilot valve when in the on condition.

4. A control unit as defined in claim 3 wherein the transporter includes an air operated engaging mechanism with an engaging inlet for urging the drive motor to the ground surface;
   and including:
   a third pressure regulator; and
   fifth conduit means in said control column connecting said control column air inlet to said engaging inlet through said third regulator, with said third regulator including means for shutting off air to said engaging inlet.

* * * * *